Patented Feb. 13, 1951

2,541,714

UNITED STATES PATENT OFFICE 2,541,714

N,N-DIALKYL THIAMORPHOLINIUM ALKYL SULFATES

Joseph B. Niederl, Brooklyn, N. Y., and William F. Hart, Easton, Pa., assignors to J. B. Niederl & Associates, Inc., New York, N. Y., a corporation of New York No Drawing. Application August 11, 1948, Serial No. 43,777

4 Claims. (Cl. 260—243)

This invention relates to new and valuable quaternary thiamorpholinium alkyl sulfates and derivatives thereof.

In the present invention thiamorpholinium compounds are claimed in which the carbon content in the two ionic groupings of the molecule are well balanced.

To achieve this effect in the present invention, thiamorpholinium alkyl sulfates are claimed, in which the alkyl radical in the sulfate group contains from twelve to eighteen carbon atoms. Hence, the new compounds claimed in the present invention may be represented by the following general structural formula:

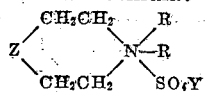

in which Z is S, SO and $SO_2$, R any alkyl radical and Y an alkyl or cyclo-alkyl radical containing at least twelve carbon atoms.

Accordingly, in some of the compounds claimed in this invention, Y may be identical with one (a) or both (b) the alkyl radicals linked to the quaternary nitrogen atoms. This is the case when N-alkyl-thiamorpholines are reacted with symmetrical di-alkyl sulfates as illustrated below:

(a) $Z:(CH_2CH_2)_2:N—R + Y_2SO_4 \rightarrow$
    $Z:(CH_2CH_2):N(R)Y^+SO_4Y^-$ (b) $Z:(CH_2CH_2)_2:N—Y + Y_2SO_4 \rightarrow$
    $Z:(CH_2CH_2):N(Y)_2^+SO_4Y^-$ If reactants of the type as illustrated above are chosen, the postulations presented in patent application Serial No. 787,468, filed November 21, 1947, pertaining to the corresponding oxygenated analogs apply without reservations and hence, need not be repeated here again.

If, however, N-alkyl-thiamorpholines, their oxides or dioxides are treated with unsymmetrical di-alkyl sulfates ($RSO_4Y$: R different from Y) then situations arise which have been adequately disclosed in patent application Serial No. 41,728 pertaining to "Unsymmetrical Quaternary Ammonium Alkyl Sulfates" in which the carbon content of the anion is equal ($Y=R_4$) and larger ($Y>R_4$). These situations arise when certain N-alkyl thiamorpholines are treated with suitable unsymmetrical di-alkyl sulfates as illustrated below. Equionics (c) and compounds in which the carbon content of the anion is larger than that of the cation (d) are produced as follows:

(c) $Z:(CH_2CH_2)_2:N—CH_3 + CH_3SO_4C_6H_{13} \rightarrow$
    $Z:(CH_2CH_2)_2:N(CH_3)_2^+SO_4C_6H_{13}^-$ (d) $Z:(CH_2CH_2)_2:N—R + RSO_4Y \rightarrow$
    $Z:(CH_2CH_2)_2:N(R)_2^+SO_4Y^- (Y>R)$ The N-alkyl-thiamorpholines, their oxides and dioxides used in practicing the present invention have been disclosed and described before by the inventors (Journal of the American Chemical Society, vol. 66, p. 1610 (1944), and vol. 68, p. 714 (1946), and Patent No. 2,439,749). They correspond to the general formula $Z:(CH_2CH_2)_2:N—R$ in which Z is S, SO or $SO_2$ and R an alkyl radical, $C_nH_{2n+1}$ containing one to eighteen carbon atoms. Most important of this whole series are the N-methyl-, N-ethyl-, N-ethylol-, N-lauryl-, N-myristyl-, N-cetyl and N-octadecyl thiamorpholines.

Two sets of di-alkyl sulfates are used in this invention. The symmetrical di-alkyl sulfates, comprise the di-n-propyl, di-n-butyl-, di-n-amyl, di-n-hexyl-, di-n-heptyl-, di-n-octyl-, di-n-decyl-, di-lauryl-, di-myristyl-, di-cetyl and di-octadecyl sulfates. Most of the unsymmetrical di-alkyl sulfates employed, were methyl-alkyl sulfates in which the alkyl radical was n-hexyl, n-heptyl, n-octyl-, n-decyl, lauryl, myristyl-, cetyl- and octadecyl. Also symmetrical as well as unsymmetrical cyclo-alkyl sulfates can be utilized.

The process employed is essentially the same as described in patent application Serial Nos. 787,468 and 41,728 and as described in Journal of the American Chemical Society, vol. 70, page 618 (1948).

Practical applications of the compounds claimed in this invention are again in the creation of compounds of predetermined properties. Such properties pertain to solubility, capillary and surface activity, detergency, germicidal and fungicidal behaviour. Compounds claimed in this invention range from fair solubility in water to almost complete insolubility and vice versa, from complete solubility to complete insolubility in non-polar solvents. Again the postulations as expressed in patent applications Serial Nos. 787,468 and 41,728 apply without reservation. The cheapness of the starting materials ("mustard gas" and readily available primary amines) suggests possibility of large scale industrial applications.

*Example.—Thiamorpholines with di-cetyl sulfate*

One tenth mol of N-lauryl-, or N-myristyl, or N-cetyl, or N-octadecyl thiamorpholine is mixed with one tenth mol of di-cetyl sulfate (M. P. 72–73° C.). An equal amount volume of toluene is added to facilitate the mixing. The reaction mixture is then refluxed, using an oil bath with an external temperature of 160–170° C. After refluxing the reaction mixture for four hours, the heating is discontinued and the toluene distilled off under reduced pressure. A little alcohol is added to facilitate the removal of the toluene. The residue so obtained is crystallized from hot ethyl acetate, or a mixture of ethyl acetate and ethyl alcohol. In cases where decolorization was necessary this is done with Darco in an ethyl alcohol solution. The melting points of the compounds thus produced are:

N-dodecyl-N-cetyl-thiamorpholinium cetyl sulfate M. P.: 160° C. (uncorr.)
N-tetradecyl-N-cetyl-thiamorpholinium cetyl sulfate M. P.: 127° C. (uncorr.)
N,N-di-cetyl-thiamorpholinium cetyl sulfate M. P.: 84° C. (uncorr.)
N-cetyl-N-octadecyl thiamorpholinium cetyl sulfate M. P.: 86° C. (uncorr.)

Using the corresponding thiamorpholine-oxides and di-oxides with di-cetyl sulfate and employing the procedure given above the following compounds were obtained:

N-dodecyl-N-cetyl-thiamorpholinium-oxide cetyl sulfate M. P.: 124° C. (uncorr.)
N-dodecyl-N-cetyl-thiamopholinium-dioxide cetyl sulfate M. P.: 71° C. (uncorr.)
N-tetradecyl-N-cetyl-thiamorpholinium-oxide cetyl sulfate M. P.: 121° C. (uncorr.)
N-tetradecyl-N-cetyl-thiamorpholinium-dioxide cetyl sulfate M. P.: 78° C. (uncorr.)
N,N-di-cetyl-thiamorpholinium-oxide cetyl sulfate M. P.: 126° C. (uncorr.)
N,N-di-cetyl-thiamorpholinium-dioxide cetyl sulfate M. P.: 117° C. (uncorr.)
N-cetyl-N-octadecyl-thiamorpholinium-oxide cetyl sulfate M. P.: 92° C. (uncorr.)
N-cetyl-N-octadecyl-thiamorpholinium-dioxide cetyl sulfate M. P.: 116° C. (uncorr.)

Using the same procedure but different N-alkyl-thiamorpholines, thiamorpholine-oxides and di-oxides and also different symmetrical di-alkyl sulfates the compounds enumerated below were obtained:

| Compounds: Sulfates | Reactants | |
|---|---|---|
| | Thiamorpholines | Sulfates |
| N-Methyl-N-n-propyl-thiamorpholinium n-propyl. | N-methyl | Di-n-propyl. |
| N-Methyl-N-n-butyl-thiamorpholinium n-butyl. | do | Di-n-butyl. |
| N-Methyl-N-n-hexyl-thiamorpholinium n-hexyl. | do | Di-n-hexyl. |
| N-Methyl-N-n-octyl-thiamorpholinium n-octyl. | do | Di-n-octyl. |
| N-Methyl-N-n-decyl-thiamorpholinium n-decyl. | do | Di-n-decyl. |
| N-Methyl-N-lauryl-thiamorpholinium lauryl. | do | Di-lauryl. |
| N-Methyl-N-myristyl-thiamorpholinium myristyl. | do | Di-myristyl. |
| N-Methyl-N-cetyl-thiamorpholinium cetyl. | do | Di-cetyl. |
| N-Methyl-N-octadecyl-thiamorpholinium octadecyl. | do | Di-octadecyl. |
| N-Ethylol-N-n-hexyl-thiamorpholinium n-hexyl. | N-ethylol | Di-n-hexyl. |
| N-Ethylol-N-lauryl-thiamorpholinium lauryl. | do | Di-lauryl. |
| N-Ethylol-N-octadecyl-thiamorpholinium octadecyl. | do | Di-octadecyl. |
| | Thiamorpholine-oxides | Sulfates |
| N-Methyl-N-n-hexyl-thiamorpholinium-oxide n-hexyl. | N-methyl | Di-n-hexyl. |
| N-Methyl-N-lauryl-thiamorpholinium-oxide lauryl. | do | Di-lauryl. |
| N-Methyl-N-octadecyl-thiamorpholinium-oxide octadecyl. | do | Di-octadecyl. |
| | Thiamorpholine-dioxides | Sulfates |
| N-Methyl-N-n-hexyl-thiamorpholinium-dioxide n-hexyl. | N-methyl | Di-n-hexyl. |
| N-Methyl-N-lauryl-thiamorpholinium-dioxide lauryl. | do | Di-lauryl. |
| N-Methyl-N-octadecyl-thiamorpholinium-dioxide octadecyl. | do | Di-octadecyl. |

What we claim is:

1. Compounds of the general formula:

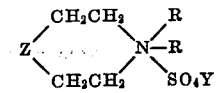

in which Z represents an atomic grouping selected from the class consisting of S, SO, and SO$_2$, R an alkyl radical containing from one to eighteen carbon atoms and Y an alkyl radical containing from twelve to eighteen carbon atoms.

2. Compounds of the general formula:

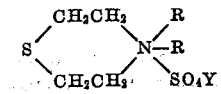

in which R is an alkyl radical containing from one to eighteen carbon atoms and Y an alkyl radical containing from twelve to eighteen carbon atoms.

3. Compounds of the general formula:

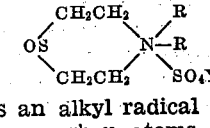

in which R is an alkyl radical containing from one to eighteen carbon atoms and Y an alkyl radical containing from twelve to eighteen atoms.

4. Compounds of the general formula:

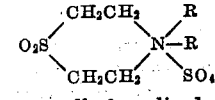

in which R is an alkyl radical containing from one to eighteen carbon atoms and Y an alkyl radical containing from twelve to eighteen carbon atoms.

JOSEPH B. NIEDERL.
WILLIAM F. HART.

REFERENCES CITED

The following references are of record in the file of this patent:

UNITED STATES PATENTS

| Number | Name | Date |
|---|---|---|
| 2,001,584 | Reed | May 14, 1935 |
| 2,152,047 | Hahl et al. | Mar. 28, 1939 |
| 2,295,504 | Shelton | Sept. 8, 1942 |
| 2,380,325 | Niederl et al. | July 10, 1945 |
| 2,395,336 | MacMullen et al. | Feb. 19, 1946 |
| 2,417,992 | Niederl et al. | Mar. 25, 1947 |
| 2,439,749 | Niederl et al. | Apr. 13, 1948 |

OTHER REFERENCES

Niederl et al.: Jour. Amer. Chem. Soc., vol. 66 (1944), p. 1610.

Shelton: Jour. Amer. Chem. Soc., vol. 68 (1946), pp. 757–759.